United States Patent Office 3,592,663
Patented July 13, 1971

3,592,663
FLUFFY FROSTING COMPOSITIONS
Gordon F. Brunner and Benjamin Lawrence, Springfield Township, Hamilton County, Norman B. Howard, Hamilton, and Paul Seiden, Cincinnati, Ohio, assignors to The Procter & Gamble Company, Cincinnati, Ohio
No Drawing. Filed Mar. 11, 1968, Ser. No. 711,862
Int. Cl. A23g 3/00
U.S. Cl. 99—139         13 Claims

ABSTRACT OF THE DISCLOSURE

Fluffy frosting compositions (in the form of a dry mix or finished product) based on certain fatty acid esters of polyglycerol where a specified minimum amount of the fatty acid contains at least 22 carbon atoms.

BACKGROUND OF THE INVENTION

The field of this invention is food products. More specifically, the invention relates to edible toppings known as fluffy frostings. Fluffy frostings are uncooked, generally shortening-free, aqueous, compositions which are used as toppings on cakes, cupcakes, and other desserts. Fluffy frostings are normally light and highly aerated. They have a unique and desirable mouth feel and eating quality provided by the high level of aeration (combined usually with the absence of shortening) and therefore these products always have been and continue to be highly favored by consumers as a topping or filling for baked items, ice cream, candy and the like.

Fluffy frostings conventionally consist predominantly of sugar and water and also must contain a foaming/aerating agent. As prepared in the home, fluffy frostings almost always utilize egg white as the foaming/aerating agent. Dry mixes which can be whipped into a fluffy frosting upon the addition of water are commercially available. These products generally utilize egg albumen or a similar protein source as the foaming/areating agent and they also contain a stabilizer for the foam which is usually a gum-type material such as algin, gelatin, or a cellulose derivative such as carboxymethyl cellulose.

A primary disadvantage possessed by conventional fluffy frostings is their instability over a period of time. For example, it is well known that fluffy frostings, although highly aerated and of desirable eating quality when fresh, generally lose air and/or liquid and become rubbery or marshmallow-like upon storage or while standing on a cake overnight. This disadvantage is seen both in home-made fluffy frostings and in currently available prepared mix products. This instability characteristic also explains why "ready-to-spread" prepared fluffy frostings have not been made commercially available.

A further disadvantage possessed by commercially available fluffy frosting mixes is the fact that the protein foaming/aerating agent is generally a very expensive ingredient and is suceptible to microbiological attack. For example, the most commonly used protein foaming/aerating agent, egg albumen, is expensive and is known to be susceptible to microbiological problems.

Thus, there is a need in the edible topping art to provide new and improved fluffy frostings, both in the form of prepared frosting per se and in the form of dry mix products, that overcome the above-described deficiences.

SUMMARY OF THE INVENTION

In accordance with present invention, it has been discovered that novel fluffy frostings can be based on certain polyglycerol esters of fatty acid as the foaming/aerating agent. The frostings of this invention can be highly aerated and are so exceptionally stable that they do not require a stabilizer. These frostings are uncooked, preferably shortening-free, and can be provided either in the form of a dry mix or in the form of a prepared or finished frosting product.

More specifically, the present invention provides a fluffy frosting composition containing polyglycerol ester of fatty acid comprising from about 5 to about 12 glycerol units and from about 1 to about 4 fatty acid groups, at least about 40% of the fatty acid having at least about 22 carbon atoms. In a certain preferred embodiment of the invention, the fatty acids of the polyglycerol ester have a specific chain length distribution within a $C_{10}$–$C_{22}$ range. In another preferred embodiment of the invention, the frosting composition is provided in the form of a dry prepared mix, preferably with the polyglycerol ester component being combined with a polyhydric alcohol carrier.

DESCRIPTION OF THE PREFERRED EMBODIMENTS

The characterizing ingredient in the fluffy frosting compositions of the present invention comprises certain polyglycerol esters of fatty acid. These materials are polyglycerol esters containing from about 5 to about 12 glycerol units and from about 1 to about 4 fatty acid groups per molecule. The polyglycerol essentially is a polymer which is formed by the dehydration of glycerine. For each unit of glycerine that is added to the polymer chain there is an increase of 1 hydroxyl group and, in the practice of this invention, from about 1 to about 4 of these hydroxyl groups of the polyglycerol molecule from ester links with fatty acids having from about 8 to about 26 carbon atoms, at least 40% of said fatty acids having at least about 22 carbon atoms.

As with ordinary glycerol or other polyols, polyglycerols can be esterified by reaction with fatty acids. Esterification can take place at any or all of the hydroxyl groups but generally occurs predominantly at the secondary hydroxyl positions, leaving the terminal hydroxyl group unaffected. Depending upon the reaction conditions and the ratio of fatty acid to polyglycerol, the number of secondary hydroxyl groups which are esterified varies. By controlling the balance of esterified to unesterified hydroxyl groups, the lipophilic-hydrophilic balance of the polyglycerol ester can be varied. With an increasing number of esterified hydroxyl groups, the polyglycerol esters become progressively more lipophilic and progressively less hydrophilic. This lipophilic-hydrophilic balance in the polyglycerol ester is important in the fluffy frosting compositions of this invention. It has been found that sufficient lipophilic properties are imparted to the polyglycerol ester by the fatty acid esterification of a single hydroxyl group. However, to maintain sufficient hydrophilic properties in the molecule, the ployglycerol ester cannot contain more than about 4 fatty acid radicals. Preferably, the polyglycerol ester will contain about 3 fatty acid radicals. In this same regard, the polyglycerol ester used in the fluffy frosting compositions of this invention can contain from about 5 to about 12 glycerol units, and preferably contains about 10 glycerol units.

By far the most important requirement of the polyglycerol ester used in this invention is the carbon atom chain length of the fatty acid groups. This chain length can range from about 8 to about 26 carbon atoms, but at least about 40% by weight of the fatty acids must contain at least about 22 carbon atoms. It has been discovered that the 40% minimum amount of $C_{22}$ or higher fatty acid provides fluffy frostings with outstanding stability properties as discussed in more detail hereinafter.

The fatty acid groups can be derived from sutiable naturally-occurring or synthetic fatty acids and can be saturated or unsaturated, but are preferably substantially saturated. Examples of these fatty acids are caprylic, capric, lauric, myristic, palmitic, stearic, oleic, linoleic, arachidic, behenic, crucic, lignoceric, and shibic. The latter four named fatty acids contain at least about 22 carbon atoms. Behenic ($C_{22}$) is the preferred fatty acid of the polyglycerol esters in this fluffy frosting invention.

While it is customary to esterify polyglycerol with a single type of fatty acid, polyglycerol which has been esterified with a mixture of fatty acids can be used in the fluffy frosting compositions herein. A preferred mixture of fatty acids comprises (on a weight percent basis) behenic 40%–80%, arachidic 0%–45%, stearic 4%–60%, palmitic 2%–20%, myristic 0%–20%, lauric 0%–18%, and capric 0–10%. The polyglycerol ester of mixed fatty acids can comprise mixed fatty acid radicals on each individual polyglycerol molecule (so that all the polyglycerol molecules are substantially the same) or can comprise the same fatty acid radical on each individual polyglycerol ester molecule (so that all the individual polyglycerol molecules are not the same).

It should also be understod that in actual practice polyglycerol esters usually contain a mixture of molecules that average the specified number of glycerol units and fatty acid ester groups per glycerol unit; individual molecules within the mixture can vary from the average. For example, decaglycerol tribehenate contains an average of about 10 glycerol units per molecule and an average of about 3 fatty acid ester (behenoyl) groups per molecule while some individual molecules could contains 8, 9, 11, or 12 glycerol units and 2 or 4 fatty acid ester groups. Such mixtures are within the scope of this invention.

Fatty acids per se or naturally occurring fats and oils can serve as the source for the fatty acid component of the polyglycerol esters. For example, rapeseed oil provides a good source for $C_{22}$ fatty acid. The $C_{16}$–$C_{18}$ fatty acid can be provided by tallow, soybean oil or cottonseed oil. The shorter chain fatty acids can be provided by coconut, palm kernel, or babassu oils. When using naturally-occurring fats and oils as the fatty acid source, it is preferred that they be substantially completely hydrogenated, e.g., to an I.V. of less than about 10.

The polyglycerol esters can be prepared by conventional direct or interesterification techniques. Suitable methods of forming the specified polyglycerol esters are disclosed by Harris, U.S. Patents 2,022,766 and 2,023,388, both granted Dec. 3, 1935, and in British Patent 1,025,265, Apr. 6, 1966. See also Bakers Digest, 37, #5, pp. 72–75 (October 1963).

More specifically, decaglycerol tribehenate, a preferred polyglycerol ester for use herein can be prepared by the following procedure:

Equipment—50 lb. reaction vessel

| Ingredients: | Percent |
|---|---|
| Polyglycerol (decaglycerol) | 60.29 |
| Behenic acid (practical grade) | 39.41 |
| 85% phosphoric acid | .30 |
| | 100.00 |

Conditions:

Reaction time—2 hours
Reaction temp.—450° F.
Reaction pressure—⅓ atom.
Atmosphere—nitrogen (sparge)
Agitation—mechanical and $N_2$ sparge
At the end of two hours at reaction temperature, the charge is cooled to 250° F. and withdrawn from the reaction vessel.
After 16 hours the product separates into two layers:
 (1) solid, fat-like, top layer (ca. 50%) of total (polyglycerol ester).
 (2) viscous liquid bottom layer (ca. 50%), of total (unreacted polyglycerol).

The top layer is separated and purified to obtain decaglycerol tribehenate. Fluffy frosting based on decaglycerol tribehenate which can be prepared according to the above procedure is illustrated in Example I, infra.

Decaglycerol triester of certain mixed fatty acids, another preferred polyglycerol ester for use herein can be prepared by the following procedure:

1 mole decaglycerol is reacted with 0.5 mole behenic acid (80% $C_{22}$), 0.1 mole palmitic acid (95% $C_{16}$), 0.07 mole myristic acid (95% $C_{14}$), and 0.1 mole lauric acid (95% $C_{12}$). The fatty acid and decaglycerol are reacted under reduced pressure (⅓ atm.) at 410° F. for 60 minutes. The reaction mixture separates into two liquid layers where the top layer is the decaglycerol fatty acid ester with a fatty acid mol ratio of about 2.8. The top layer is separated and purified to obtain the decaglycerol triester. The fatty acid radicals are randomly distributed on the decaglycerol molecules:

| | Weight percent |
|---|---|
| Behenic ($C_{22}$) | 58 |
| Arachidic ($C_{20}$) | 10 |
| Stearic ($C_{18}$) | 6 |
| Palmitic ($C_{16}$) | 11 |
| Myristic ($C_{14}$) | 7 |
| Lauric ($C_{12}$) | 7 |
| Capric ($C_{10}$) | 1 |

Fluffy frosting based on decaglycerol mixed fatty acid esters which can be prepared according to the above procedure is illustrated in Example II, infra.

This invention provides fluffy frosting compositions based on the above-described polyglycerol esters. As with conventional fluffy frostings, water is a component of the composition when it exists in final form ready for using and eating. Thus, the polyglycerol ester can be added to water (preferably with sufficient heating to at least partially dissolve the polyglycerol ester) and the water-polyglycerol ester blend can then be whipped to form an aerated, aqueous fluffy frosting suitable for spreading, filling, and/or eating. In terms of foaming/aerating properties and stability, the fluffy frosting need only contain the specified polyglycerol ester and water. However, in order to provide a product with desired eating characteristics, additional ingredients can be combined with the polyglycerol ester either before or after the addition of water. Thus, a sweetening agent, for example, sugar or an artificial sweetener, is preferably combined with the polyglycerol ester in the preparation of an aerated, aqueous fluffy frosting.

The sweetening agent preferably included in the fluffy frosting compositions of this invention can be any suitable sugar such as sucrose, dextrose, lactose, glucose, galactose, and the like or mixtures thereof. These materials can be used in such conventional forms as cane sugar, beet sugar, corn syrup, brown sugar, maple sugar, maple syrup, honey, molasses, and invert sugar. Sucrose and/or dextrose are preferred sweetening agents. In place of all or part of the above-described sugars, artificial sweeteners such as cyclamate or saccharin can be employed. A minor amount of salt can be added and any conventional flavor material can also be added to the fluffy frosting composition. For example, vanilla, vanillin, chocolate, fruits and fruit extracts, nuts, and the like can be used as desired.

Conventional foaming/aerating agents for fluffy frostings can be added to the compositions of this invention but they are not required and are preferably omitted. These agents most often are protein or protein-containing materials such as whole milk, nonfat milk solids, soy protein, egg white, egg yolk, and egg albumen. Conventional thickening agents for fluffy frostings can also be added to the compositions of this invention to affect eating characteristics such as mouth feel, but are not required for stabilization. Among these agents are gums such as carrageenan, tragacanth, arabic and ghatti; seaweed colloids such as agar, carrageen and sodium alginate; seed extracts such as locust bean and guar; water-dispersible cellulose derivatives such as sodium carboxymethyl cellulose; starch; and gelatin. Shortening is often an ingredient of so-called creamy-type frostings but is conventionally not present in fluffy frostings. In the particular polyglycerol ester-based fluffy frosting compositions of the present invention, it is preferable to omit shortening from the formulation. Shortening or other fat, particularly in liquid form, can decrease the foaming/aerating preperties of the polyglycerol ester-based fluffy frosting compositions of the present invention. However, a small amount, e.g., less than 5% of the composition, of a plastic fat can be added to affect eating characteristics.

The fluffy frosting compositions of this invention can be prepared and made available to consumers in a variety of forms. For example, a liquid frosting composition comprising a suitable polyglycerol ester and sugar can be mixed with water and packaged in a suitable container. The user then merely whips the liquid composition to incorporate air. More preferably, the liquid frosting composition can be whipped to form an aerated, aqueous frosting that is ready to spread and/or eat. Such "prepared frostings" can be packaged in suitable containers, e.g. a sterilized airtight can, and then distributed in this form to be used by consumers without further preparation.

Alternatively, a fluffy frosting composition comprising a suitable polyglycerol ester, sugar, and water can be placed in a pressure dispensing container from which it can be removed in aerated form. The propellant for the pressure container can be any conventional non-toxic, odorless, tasteless gas including nitrogen, nitrous oxide, carbon dioxide, dichlorodifluoromethane (Freon), and the like. These containers, conventionally known as aerosol dispensers, can have a dispensing orifice of about 0.03" in diameter or less and the frosting is able to pass therethrough and be whipped during such passage.

In a preferred embodiment of the invention, the fluffy frosting composition based on the above-described polyglycerol ester is prepared and packaged in the form of a dry mix. Thus, the consumer adds water to the mix and then whips it into an aqueous, aerated fluffy frosting for use. A dry mix based on the polyglycerol ester per se is not desirable since the specific polyglycerol esters suitable for use herein exist in the form of hard, brittle waxy solids. However, dry granular ingredients, preferably sugar, can be blended with the polyglycerol ester to provide a dry, prepared mix. The term "dry mix" is not intended to totally exclude moisture as the mixes disclosed herein can include minor amounts, e.g., up to about 10%, of water.

It has been discovered that highly preferred dry mixes can be prepared by combining the polyglycerol ester with an aliphatic polyhydric alcohol carrier. The lower monohydric aliphatic alcohols of 2 to 4 carbons such as ethanol and butanol can serve as a carrier for the polyglycerol ester in a fluffy frosting dry mix. Aliphatic polyglycerols such as pentaglycerol can also be used. Alkylene glycols of from about 2 to about 6 carbon atoms such as the propylene glycols and butylene glycols are also suitable as the carrier. Within the group of aliphatic polyhydric alcohols, those having from about 2 to about 4 carbon atoms and from about 2 to about 3 hydroxyl groups are preferred. Glycerol and propylene glycol represent the most preferred carriers with glycerol being the most highly peferred. It has been discovered that the combination of the aliphatic polyhydric alcohol carrier with the polyglycerol ester component allows the preparation of a preferred dry mix by providing for a uniform dispersion of the hard brittle ester therein. Moreover, the carrier pomotes and contibutes to the foaming/aerating ability of the polyglycerol ester.

The amount of aliphatic polyhydric alcohol carrier can range from about 0.5 part to about 20 parts, preferably from about 1 part to about 10 parts, per part of polyglycerol ester.

When preparing the frosting compositions of this invention in the form of a dry mix, it is preferred to follow the following procedure: The polyglycerol ester is first combined with the polyhydric alcohol carrier and the mixture is heated, preferably to above the melting point of the polyglycerol ester, to dissolve the ester in the carrier. Most preferably, the mixture is heated to at least 130° F. The heated mixture is then rapidly chilled, for example, in a scraped wall heat exchanger such as a Votator or in a mixing bowl placed in an ice bath, to form a pasty mass. Thus, the polyglycerol ester and alcohol carrier are plasticized together. Sugar and additional dry ingredients are then blended into the pasty mass, e.g., in a ribbon blender, to form a dry mix. The dry mix can then be impact milled, for example, in an Entoleter, to remove lumps and large particles, resulting in the formation of a granular, free-flowing and uniform dry mix.

The aerated, aqueous fluffy frostings of this invention provided and packaged in liquid or a "prepared frosting" form preferably contain from about 0.1% to about 5% of the polyglycerol ester, from about 20% to about 90% sugar, and from about 10% to about 95% water.

Preferred fluffy frosting compositions provided in the form of a dry mix preferably contain from about 0.5% to about 10% of the polyglycerol ester, from about 0.5% to about 30% of the aliphatic polyhydric alcohol carrier, and from about 40% to about 95% sugar. A highly preferred dry mix contains from about 1% to about 5% polyglycerol ester, from about 1% to about 10% carrier, and from about 50% to about 90% sugar. Water is added to these mixes in an amount sufficient to provide from about 10% to about 90%, preferably from about 30% to about 60% water in the finished aerated, aqueous frosting.

When the fluffy frosting compositions are prepared in the form of a dry mix they require only the addition of water and beating in a bowl to yield within a few minutes a highly aerated, aqueous fluffy frosting with a smooth viscous texture. For example, mixing in a conventional household electric mixer for a period of less than ten minutes is sufficient to whip the composition into an aerated fluffy frosting. The compositions tend to reach minimum density faster, e.g., they reach minimum density in less than about 3 minutes, than do conventional fluffy frostings when mixed in a household electric mixer. Additional mixing, e.g., for 1 to 5 minutes beyond this point is desirable to assure uniformity.

The aerated, aqueous, fluffy frostings prepared from the compositions of this invention have a smooth viscous texture at least comparable to commercial products and an aerated structure superior thereto in terms of density and stability. Frostings of increased stability and acceptable from every standpoint, particularly in respect to their chiffon-like or fluffy mouth-feel, are provided by the invention.

The fluffy frosting compositions disclosed herein are economical to use and have a particular advantage in this respect in that substantially more volume of frosting can be obtained from a given weight of ingredients than with conventional fluffy frostings because of the high aeration properties and corresponding low density of the frostings of this invention.

The frostings of the invention are more aerated than conventional fluffy frostings as indicated by their density which is generally less than about 0.3 gm./cc. and preferably less than 0.2 gm./cc. Because of the high level of air which they contain, the frostings have a very desirable glossy-type appearance. The frostings of the invention are extremely stable; for example, they can be spread on a cake in peaks and the peaks remain over substantial periods of storage time. Moreover, the icings do not have a tendency to leak, i.e., lose liquid upon storage. Further, the frostings do not change in appearance or eating quality upon storage. The exceptional stability properties of the fluffy frostings discussed above are directly related to use of the specified polyglycerol ester containing at least 40% $C_{22}$ or higher fatty acid. When polyglycerol esters not meeting this requirement are substituted for the specified polyglycerol ester, the stability advantages are not obtained. The preferred polyglycerol ester of mixed $C_{10}$–$C_{22}$ fatty acids described hereinbefore provides the desired stability because of its greater than 40% $C_{22}$ content, and in addition, provides dry mixes that can be most readily whipped into aerated, aqueous fluffy frostings having preferred viscosity and texture.

Example I.—Dry frosting mix based on decaglycerol tribehenate, and frosting prepared therefrom Dry Mix Preparation.—One part decaglycerol tribehenate (DGTB) was added to five parts glycerol and the mixture heated on a steam bath until the DGTB was dissolved (melting point: ca. 150° F.). The heated mixture was rapidly chilled by agitating in a mixing bowl placed in an ice-water bath for ten minutes to form a smooth creamy paste.

Two parts sugar and one part of the paste were blended in a mixing bowl to form a cream-like mass. Additional sugar and the other ingredients listed below were blended into the cream until a dry granular mixture was formed. The mixture was then passed through an impact mill (Entoleter) to reduce lumps and large particles. A granular, free-flowing and uniform dry mix was thus obtained.

DRY MIX COMPOSITION

| Ingredient | Percent by weight |
|---|---|
| Sugar (sucrose) | 81.67 |
| Sugar (dextrose) | 5.00 |
| DGTB-glycerol blend | 12.00 |
|   2% DGTB | |
|   10% glycerol | |
|   12% | |
| Salt | 0.30 |
| Flavor (cream of tartar, vanilla, almond) | 1.03 |
| | 100.00 |

Frosting preparation.—Aerated, aqueous fluffy frosting was prepared by adding 88 grams of water at 95° F. to 3.5 ounces of the above-prepared dry mix, blending at slow speed (about 100 r.p.m.) on a conventional household electric mixer for ½ minute, and mixing at high speed (about 850 r.p.m.) for 5 minutes. The finished aqueous, aerated frosting was fluffy and delectable and had a smooth, viscous texture. It had a density of 0.16 gm./cc. and a Brookfield viscosity (5/D) of 30. After overnight storage, loosely covered, at 75° F., and at 90° F., the frosting did not change in appearance or eating quality.

The stability of the frosting prepared in Example I was further evaluated by uniformly icing the outside surface of conventional 8-inch cake pans, making peaks on top of the frosting by touching the end of a spatula lightly to the frosting surface and pulling up. The pans were loosely covered, allowed to stand overnight at 75° F., and changes in the peaks were then observed. The frosting of Example I formed stiff stable peaks initially that remained unchanged during the overnight period.

For comparative purposes, two additional frostings were prepared corresponding to the Example I frosting in composition and method except that the DGTB was replaced respectively by decaglycerol tristearate (DGTS) and decaglycerol trilaurate (DGTL). The DGTS frosting formed stiff stable peaks initially which were over 50% broken down (collapsed) after the overnight period. The DGTL frosting formed weak unstable peaks initially which were totally broken down after the overnight period.

The stability of the frosting prepared in Example I was further evaluated by a leakage test. The leakage test measures the amount of liquid (water or sugar syrup) that drains from a standard volume of frosting under the relative humidity conditions established by the frosting itself in a closed system at a temperature of 90° F. over a period of 16 hours and is a very sensitive indirect measurement of the propensity of a frosting to "disappear into a cake." The test utilized a stainless steel cylindrical leakage cup (height=2 inches, inside diameter=2 inches) with a stainless steel 16 mesh wire cloth bottom placed in a 12 oz. wide-mouth jar with tight sealing lid. When subjected to this test, the frosting of Example I exhibited 0.0 gram of leakage.

For further comparative purposes, a commercially available brand of conventional fluffy frosting mix was obtained. This mix contained egg albumen as the foaming/aerating agent and a combination of gelatin and carboxymethylcellulose as the stabilizing agent. Frosting was prepared according to the label instructions by adding 120 grams of 200° F. water to 6.5 ounces of dry mix, blending at low speed (about 100 r.p.m.) on a conventional household electric mixer for ½ minute, and mixing at high speed (about 850 r.p.m.) for 5 minutes. The finished aqueous, aerated frosting was fluffy and delectable and had a smooth viscous texture. It had a density of 0.35 gm./cc. and a Brookfield viscosity (5/D) of 38. In the leakage test described above, the frosting exhibited 9.0 grams leakage. After overnight storage, loosely covered, at 75° F., the frosting changed in appearance and became rubbery and marshmallow-like. After overnight storage, loosely covered at 90° F., the frosting changed in appearance and became rubbery and deaerated.

Example II.—Dry frosting mix based on decaglycerol triester of mixed $C_{10}$–$C_{22}$ fatty acids containing 58% $C_{22}$, and frosting prepared therefrom Dry mix preparation.—One part decaglycerol triester of mixed $C_{10}$–$C_{22}$ fatty acids (DGTM) was added to 5 parts glycerol and the mixture heated on a steam bath until the DGTM dissolved (Melting Point: ca. 150° F.). The heated mixture was rapidly chilled by agitating in a mixing bowl placed in an ice-water bath for 10 minutes to form a smooth creamy paste.

Two parts sugar and one part of the paste were blended in a mixing bowl to form a cream like mass. Additional sugar and the other ingredients listed below were blended into the cream until a dry granular mixture was formed. The mixture was then passed through an impact mill (Entoleter) to reduce lumps and large particles. A granular, free-flowing and uniform dry mix was thus obtained.

DRY MIX COMPOSITION

| Ingredient: | Percent by weight |
|---|---|
| Sugar (sucrose) | 81.67 |
| Sugar (dextrose) | 5.00 |
| DGTM—glycerol blend | 12.00 |
|   2% DGTM | |
|   10% glycerol | |
|   — | |
|   12% | |
| Salt | 0.30 |
| Flavor (cream of tartar, vanilla, almond) | 1.03 |
| | 100.00 |

[1] The DGTM had a mol ratio of fatty acid to decaglycerol of 2.8 and had the folowing random fatty acid composition on a weight percent basis:

| | Percent |
|---|---|
| ($C_{22}$) | 58 |
| ($C_{20}$) | 10 |
| ($C_{18}$) | 6 |
| ($C_{16}$) | 11 |
| ($C_{14}$) | 7 |
| ($C_{12}$) | 7 |
| ($C_{10}$) | 1 |
| | 100 |

Frosting preparation.—Aqueous, aerated fluffy frosting was prepared by adding 88 grams of water at 95° F. to 3.5 ounces of the above-prepared dry mix, blending at slow speed (about 100 r.p.m.) on a conventional household electric mixer for ½ minute, and mixing at high speed (about 850 r.p.m.) for 5 minutes. The finished aqueous, aerated frosting was fluffy and delectable and had a very smooth viscous texture. It had a density of 0.15 gm./cc. and a Brookfield viscosity (5/D) of 45. After overnight storage, loosely covered, at 75° F., and at 90° F., the frosting did not change in appearance. The frosting thus had the stability advantages of the Example I frosting and had preferred physical properties as indicated by its desirable smoothness and increased viscosity.

The following fluffy frosting dry mix compositions are prepared in the manner described in Example I. To each mix, water can be added and the composition then whipped into a desirable aqueous, aerated fluffy frosting:

Example III

| Ingredient: | Part by weight |
|---|---|
| Sugar (sucrose | 85.00 |
| 3:1 mixture octaglycerol monobehenate and octaglycerol monostearate | 5.00 |
| Propylene glycol | 8.00 |
| Flavor | 2.00 |

Example IV

| Ingredient: | Percent by weight |
|---|---|
| Sugar (sucrose) | 70.00 |
| Sugar (dextrose) | 20.00 |
| Sugar (lactose) | 5.00 |
| 1:1 mixture of dodecaglycerol tetrabehenate and pentaglycerol monolaurate | 2.00 |
| Butylene glycol | 3.00 |

Example V

| Ingredient: | Percent by weight |
|---|---|
| Sugar (sucrose) | 73.00 |
| Sugar (dextrose) | 10.00 |
| Sugar (glucose) | 10.00 |
| Decaglycerol monobehenate | 0.50 |
| Glycerol | 5.00 |
| Flavor | 1.50 |

Example VI

| Ingredient: | Percent by weight |
|---|---|
| Sugar (sucrose) | 50.00 |
| Decaglycerol triester of substantially completely hydrogenated rapeseed oil (I.V. 8) | 10.00 |
| Propylene glycol | 30.00 |
| Gelatin | 7.00 |
| Flavor (including artificial sweeteners) | 3.00 |

Example VII

| Ingredient: | Percent by weight |
|---|---|
| Sugar (sucrose) | 54.00 |
| Starch (wheat) | 30.00 |
| Decaglycerol triester of mixed fatty acids: 70% $C_{22}$; 7% $C_{20}$; 15% $C_{18}$; 8% $C_{16}$ | 2.00 |
| Glycerol | 10.00 |
| Carboxymethyl cellulose | 0.20 |
| Salt, flavor | 2.80 |
| Gelatin | 1.00 |

Ready-to-use aerated, aqueous, prepared fluffy frostings are provided by mixing the ingredients listed below, whipping to a density of 0.3 gm./cc., and then packaging in an airtight container:

Example VIII

| Ingredient: | Percent by weight |
|---|---|
| Sugar (sucrose) | 40.00 |
| Sugar (dextrose) | 2.50 |
| 1:1 mixture of decaglycerol tetrabehenate and pentaglycerol monoester of soybean oil hydrogenated to I.V. 10 | 2.50 |
| Glycerol | 4.00 |
| Flavor | 1.00 |
| Water | 50.00 |

EXAMPLE IX

| Ingredient: | Percent by weight |
|---|---|
| 1:1 mixture of decaglycerol tribehenate and decaglycerol tristearate | 5.00 |
| Carboxymethyl cellulose | 4.00 |
| Artificial sweetener and flavor | 2.00 |
| Water | 89.00 |

The compositions of this invention have been referred to herein as fluffy frostings to most particularly define and describe their eating (mouth-feel) and aeration characteristics. They can be used whenever it is desirable to have an edible composition having these properties, e.g., whenever it is desirable to have a topping for cakes, cupcakes, ice cream, or a filler for pies, baked sweet goods, and candy.

All percentages, proportions and parts herein are by weight unless specified otherwise.

What is claimed is:

1. A fluffy frosting composition having a density of less than about 0.3 gm./cc. containing about 0.1% to about 5% polyglycerol ester of fatty acid comprising from about 5 to about 12 glycerol units and from about 1 to about 4 fatty acid groups, at least about 40% of the fatty acid having at least about 22 carbon atoms and the balance comprising a sweetening agent and water.

2. The fluffy frosting composition of claim 1 wherein the sweetening agent is sugar.

3. The fluffy frosting composition of claim 1 consisting essentially of the polyglycerol ester, the sweetening agent and the water.

4. A fluffy frosting dry mix composition containing about 0.5% to about 10% polyglycerol ester of fatty acid comprising from about 5 to about 12 glycerol units and from about 1 to about 4 fatty acid groups, at least about 40% of the fatty acid having at least about 22 carbon atoms, about 0.5% to about 30% aliphatic polyhydric alcohol carrier and the balance comprising a sweetening agent.

5. The dry mix of claim 4 wherein the sweetening agent is sugar.

6. The dry mix of claim 5 which contains from about 40% to about 90% sugar.

7. The dry mix of claim 4 consisting essentially of the polyglycerol ester, the polyhydric alcohol carrier, and the sweetening agent.

8. The dry mix of claim 6 wherein the aliphatic polyhydric alcohol carrier has from about 2 to about 4 carbon atoms, and from about 2 to about 3 hydroxyl groups.

9. The dry mix of claim 8 wherein the aliphatic polyhydric alcohol carrier is selected from the group consisting of glycerol and propylene glycol.

10. The dry mix of claim 9 where the polyglycerol ester is decaglycerol tribehenate.

11. The dry mix of claim 9 where the polyglycerol ester is decaglycerol triester of mixed fatty acid comprising: behenic 40%–80%, arachidic 0%–45%, stearic 4%–60%, palmitic 2%–20%, myristic 0%–20%, lauric 0%–18%, capric 0%–10%.

12. An aerated, aqueous frosting prepared from the dry mix of claim 11 and containing about 10% to about 90% water and having a density of less than about 0.3 gm./cc.

13. A method of making a fluffy frosting dry mix composition, which comprises: combining a polyglycerol ester of fatty acid comprising from about 5 to about 12 glycerol units and from about 1 to about 4 fatty acid groups, at least 40% of the fatty acid having at least about 22 carbon atoms with about 0.5 part to about 20 parts of an aliphatic polyhydric alcohol carrier per part of the polyglycerol ester; heating the mixture to dissolve the ester in the carrier; rapidly chilling the heated mixture to form a pasty mass; and blending sufficient sugar into the pasty mass to form the dry mix.

References Cited

UNITED STATES PATENTS

| | | | |
|---|---|---|---|
| 3,210,198 | 10/1965 | Keller | 99—139 |
| 3,230,090 | 1/1966 | Weiss | 99—139 |

FOREIGN PATENTS

| | | | |
|---|---|---|---|
| 1,025,265 | 4/1966 | Great Britain | 99—139 |

RAYMOND N. JONES, Primary Examiner

J. M. HUNTER, Assistant Examiner

U.S. Cl. X.R.

99—189